United States Patent [19]

Taka et al.

[11] Patent Number: 4,544,257
[45] Date of Patent: Oct. 1, 1985

[54] AUTOMATIC EXPOSURE CONTROL FOR A CAMERA SHUTTER

[75] Inventors: Hideo Taka, Tokyo, Japan; Bernhard H. Andresen, Dallas, Tex.

[73] Assignee: Texas Instruments Incorporated, Dallas, Tex.

[21] Appl. No.: 597,768

[22] Filed: Apr. 6, 1984

[51] Int. Cl.[4] ............................................. G03B 7/083
[52] U.S. Cl. ..................................... 354/460; 354/464
[58] Field of Search ................ 354/459, 460, 464, 484

[56] References Cited
U.S. PATENT DOCUMENTS 4,300,825 11/1981 Kitaura et al. ...................... 354/459

Primary Examiner—Russell E. Adams
Attorney, Agent, or Firm—Richard A. Bachand; N. Rhys Merrett; Melvin Sharp

[57] ABSTRACT

The specification discloses an automatic shutter timing control for a camera. A voltage supply is applied to a capacitor (38). An electronic switch such as a PMOS gate (44) has conductive and non-conductive states and is connected across the capacitor (38). A pair of transistors (32) and (40) are interconnected in a current mirror configuration and are connected between the voltage supply and the capacitor (38) and are operable in conjunction with a charging resistor (30) such that the capacitor (38) may be charged to a predetermined voltage when the PMOS device (44) is in a non-conductive state. A transistor (54) is operable to receive an electrical control signal in order to sink current from the charging resistor (30) and to prevent current flow through the PMOS device (44). A comparator (42) is responsive to a predetermined voltage on the capacitor (38) to control the camera shutter.

3 Claims, 4 Drawing Figures

AUTOMATIC EXPOSURE CONTROL FOR A CAMERA SHUTTER

TECHNICAL FIELD

This invention relates to electronic timing circuits, and more particularly relates to an automatic exposure control for a camera shutter.

BACKGROUND OF THE INVENTION

In such previously developed exposure control circuits, mechanical switches have generally been used in order to initiate the timing interval. Such mechanical switches are operated in response to actuation of the shutter control by the camera operator. While such mechnical switches have provided good service, a need has arisen for an electronic switch which is not subject to mechanical difficulties and which provides a longer, maintenance-free life. Conventional bi-polar electronic devices are not suitable for use as an exposure control switch, since bi-polar devices normally have inherent offset voltages which cause the capacitor to begin its charging cycle at a partially charged state, rather than at zero voltage. Initiation of charging at a partially charged state causes timing errors to be introduced in the timing cycle, since the full charging range of the capacitor is thus not available.

FIG. 1 is a block diagram of a conventional circuit which constitues an electronic switch using bi-polar elements. In FIG. 1, this prior art circuit includes a supply voltage $V_{cc}$ which is applied to a resistor 10 and one terminal of a timing capacitor 12. The resistor 10 is connected to the collector of a transistor 14, the base of which is connected via lead 16 to one input of a comparator 18. A terminal of the capacitor 12 is connected to the collector of a transistor 20 which has the base thereof connected to the base of transistor 14 and to the lead 16. The emitter of transistor 14 is connected to receive a variable control voltage and the emitter of transistor 20 is connected to receive a reference voltage, in order to allow variation of the timing interval. The collector of transistor 20 is connected via a lead 22 to the second input of the comparator 18. Emitters and collectors of bi-polar transistors $24_a$, $24_b$, $24_c$, ... $24_n$ are connected to two terminals of the capacitor 12 and the bases thereof are connected to a Discharge Signal. Transistors $24_a$ through $24_n$ are made conductive or non-conductive for automatic exposure control.

In operation, transistor 24 is normally conductive, thereby shoring out capacitor 12 and providing $V_{cc}$ potential to lead 22 as an input to comparator 18. The resulting output of the comparator 18 maintains the shutter in the closed position when the camera is not being used.

When taking a picture, the shutter is energized and the Discharge Signal makes the transistors $24_a$ through $24_n$ non-conductive from conductive immediately before the shutter is opened.

Light is passed through the shutter in order to expose the film. The circuitry illustrated in FIG. 1 controls the exposure time and automatically terminates the exposure. When transistor 24 is made non-conductive, the capacitor 12 begins to charge to a prescribed voltage. When the capacitor charges to a predetermined voltage, the voltage on lead 22 falls to a predetermined level, such that the output of comparator 18 goes low in order to activate a solenoid or the like, not shown, in order to close the shutter and terminate the exposure.

Transistors 14 and 20 are matched and provide a "mirror" current source in order to compensate for variations in the level of $V_{cc}$. $V_{cc}$ variations are cancelled out by the mirrored transistor configuration because the variations are common mode inputs to the comparator. The operation of the illustrated current mirror device is further described in the above-described co-pending patent application, Ser. No. 306,016, filed 9/28/81, now abandoned.

As described above, in the case of constituting an electronic switch using bi-polar elements, a large number of bi-polar elements connected in parallel to a capacitor are required to reduce offset voltage almost to zero. This generates a disadvantage that IC chips require a large area and thus the cost increases.

SUMMARY OF THE INVENTION

An object of this invention is to provide an automatic exposure control using a relatively small and inexpensive electronic switch and being capable of obtaining a precise exposure time.

Other objects of this invention will be made clear from the embodiments described hereinbelow.

BRIEF DESCRIPTION OF THE DRAWINGS

For a more complete understanding of the present invention and the advantages thereof, reference is now made to the following description taken in conjunction with the accompanying drawings in which.

DESCRIPTION OF THE PREFERRED EMBODIMENT

Figure 2:
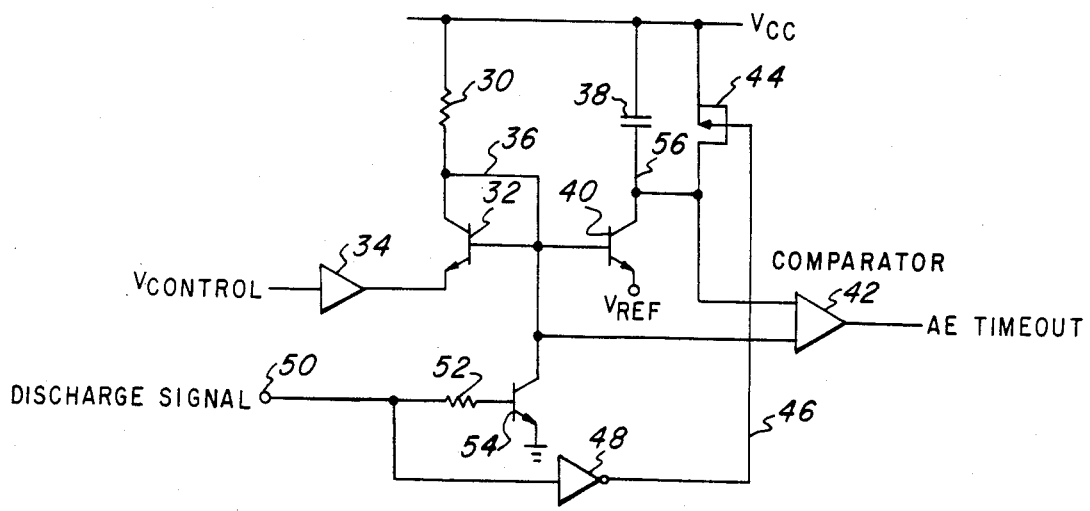
FIG. 2 illustrates a schematic diagram of a shutter control circuit for a camera of the first embodiment of the present invention.

Referring to FIG. 2, supply voltage Vcc is applied to resistor 30 which is connected to the collector of a transistor 32. The emitter of transistor 32 is connected to the output of an amplifier 34, the input of which is connected to receive a control voltage. The collector and base of transistor 32 are tied together by lead 36.

Figure 1:
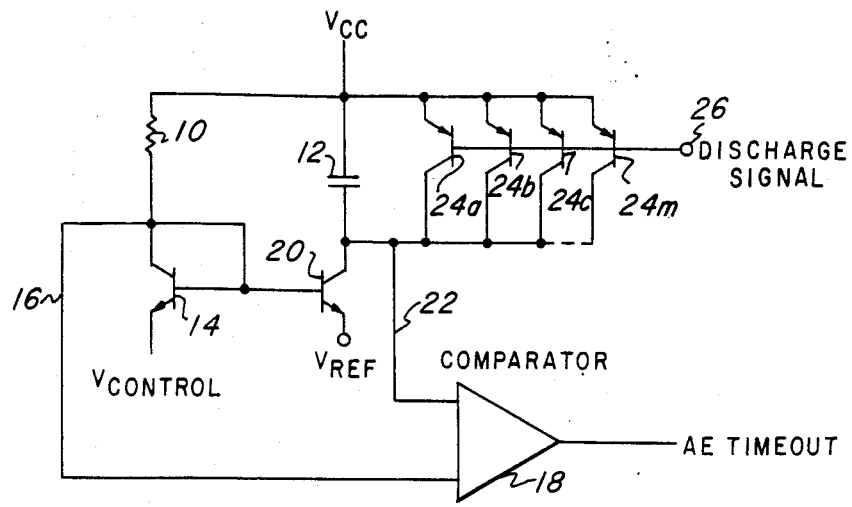
FIG. 1 illustrates a schematic diagram of a prior art exposure control device.

The supply voltage Vcc is also connected to one terminal of a capacitor or other charge storage device 38 which is connected to the collector of a transistor 40. The base of transistor 40 is tied to the base of transistor 32 to provide the mirrored current configuration shown in FIG. 1. The emitter of transistor 40 is connected to an external reference voltage. The common bases of transistors 32 and 40 are applied to one input of a comparator 42. The second input of comparator 42 is connected to the junction between the capacitor 38 and the collector of transistor 40.

A P-channel metal oxide silicon gate (PMOS) 44 is connected across the capacitor 38 to act as the switch for the capacitor 38. The gate of the PMOS device 44 is connected via a lead 46 to the output of an inverter 48. The input of inverter 48 is connected to terminal 50 to receive the Discharge Signal. The Discharge Signal is also applied via resistor 52 to the base of an NPN transistor 54. The collector of transistor 54 is connected to the bases of transistors 32 and 40 and to an input of comparator 42. The emitter of transistor 54 is connected to circuit ground.

The provision of the PMOS device 44 enables control of the capacitor 38 without introducing an inherent offset voltage thereacross and, therefore, eliminates timing errors. The PMOS device 44 is operated in its linear range such that it appears as a low resistance in the circuit. Device 44 can thus discharge the capacitor 38 to essentially zero volts if no current is flowing from the source to the drain of the device. By making the PMOS device 44 of a sufficient size, a Vcesat of less than ten millivolts at 100 micro-amps current may be provided.

The NPN transistor 54 provides an additional advantage by sinking all of the current from charging resistor 30, while reverse biasing the mirror transistors 32 and 40 to thereby inhibit charging of the capacitor 38. This enables the PMOS device 44 to be reduced in size because no DC current must be sourced through the current mirror transistor 40. The capacitor 38 can be discharged to essentially zero volts, since there is no sustaining DC current through the PMOS device 44. This provides substantially improved timing accuracy because of the very low initial voltage across the capacitor 38 when the timing circuit is activated.

In operation of the circuit shown in FIG. 2, with the discharge signal 50 present, the PMOS device 44 is normally operating in its linear range such that capacitor 38 is fully discharged. Since no collector current is flowing through transistor 40 due to transistor 54, the PMOS device 44 will discharge capacitor 38 to essentially zero voltage.

When the discharge signal is removed by exterior circuitry indicating the operation of the camera shutter, a negative signal is applied to the inverter 48 which generates a positive signal in order to change the conductivity of the PMOS device 44 to a non-conductive state. Transistors 32 and 40 are connected in a mirror configuration to provide a current mirror. Varying emitter voltages on transistors 32 and 40 control the resulting exposure time. For the shortest exposure time, the emitter voltages of transistors 32 and 40 are equal. As the emitter voltage applied from amplifier 34 to transistor 32 decreases with respect to the emitter voltage of transistor 40, the exposure time lengthens. Assuming that the base and emitter voltages of transistors 32 and 40 are equal, the voltage across resistor 30 equals the supply voltage Vcc minus the collector voltage of transistor 32. This sets the collector current through transistor 32, which is mirrored by transistor 40. This current then flows through capacitor 38. As the supply voltage Vcc varies, the voltage across resistor 30 increases or decreases, and, therefore, changes the current through charging resistor 30 and capacitor 38. The present circuitry thus automatically compensates for variations in the supply voltage. The capacitor 38 begins charging through transistor 40 at a rate determined by the resistor 30, until the charge reaches a level at which the voltage at the collectors of transistors 32 and 40 becomes equal. At this level, the voltage applied to comparator 42 is sufficient to cause the output of comparator 42 to go low, in order to terminate the exposure cycle by operation of a solenoid or other device within the camera.

As noted, the level of the control voltage applied through amplifier 34 to the emitter of transistor 32 controls the exposure time interval. This control voltage level may be generated by a light meter device or the like in order to automatically control the operation of the camera.

Prior to initiation of the exposure cycle, feedback from the shutter control causes a discharge signal to be applied to terminal 50. In response, the PMOS device 44 is operated to become conductive and causes discharge of the capacitor 38 to zero voltage. The interconnected bases of transistors 32 and 40 are thus pulled sufficiently low to shut off the transistors. As the transistor 40 has no collector current, the PMOS device 44 is able to fully discharge the capacitor 38.

As previously noted, when the discharge signal applied to terminal 50 is high, both the transistor 54 and the PMOS device 44 are activated. Upon discharge of the capacitor 38 by the PMOS device 44, the transistor 54 sinks all of the current from the resistor 30 by shutting off the current mirror to capacitor 38. This enables the PMOS device 44 to be relatively small in size, as no DC current must be sourced to the current mirror. As noted, the capacitor 38 can thus be discharged to essentially zero volts since there is no DC current through the PMOS device 44.

Figure 3:
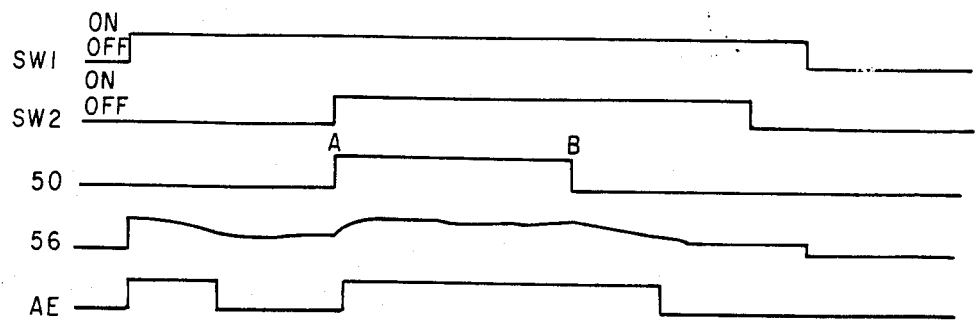
FIG. 3 shows a timing chart of the circuit shown in FIG. 2.

FIG. 3 is a timing chart of the camera operation. $SW_1$ shows ON and OFF state of a switch which is in response to the first stroke of the release button of the camera. $SW_2$ shows ON and OFF state of a switch which is in response to the second stroke of the release button. 50 shows the signal waveform of the Discharge Signal in FIG. 2. 56 shows the voltage waveform at the terminal of the capacitor 38 connected to the input of the comparator 42 in FIG. 2. AE shows the output of the comparator 42 in FIG. 2. When $SW_1$ is turned ON by the first stroke of the release button by an operator, the power source supplies the circuit with a voltage $V_{cc}$ so that 56 becomes $V_{cc}$ level and AE becomes high level. As the Discharge Signal is at low level, the capacitor 38 starts charging. At the time when the voltage of 56 becomes lower than that of 36, the comparator 42 is inverted and AE becomes low level. When $SW_2$ is turned ON (point A) by the second stroke of the release button by the operator, the camera initiates automatic focus adjusting operation (not shown). Since the Discharge Signal 50 becomes high level at point A at the same time, the capacitor 38 is discharged, so that the voltage of 56 become $V_{cc}$ level and AE becomes high level. When the automatic focus adjusting operation is completed, a solenoid for shutter, etc. are energized to initiate automatic exposure control operation. The Discharge Signal becomes low level from high level immediately before the opening of the shutter (point B) and starts the charging of the capacitor 38. When an appropriate quantity of exposure light is obtained, the voltage of 56 becomes lower than that of 36. The comparator 42 is inverted so that AE becomes low level and solenoids for shutter, etc. are deenergized, and the shutter is closed. The construction here is such that the Discharge Signal 50 is at low level from turning ON of $SW_1$ to turning ON of $SW_2$ and thus the capacitor 38 is charged, which is a mode used in examining IC and shutter mechanism. As an actual exposure control is carried out after the point B, AE's turning low level is disregarded. Discharge Signal 50 is made high level by turning on of $SW_2$ from point A to point B and the charge in the capacitor 38 is discharged. During this period, automatic focus adjusting operation is being carried out, which secures at least about 100 ms. Therefore, the capacitor 38 is sufficiently discharged and an accurate exposure time can be determined.

Figure 4:
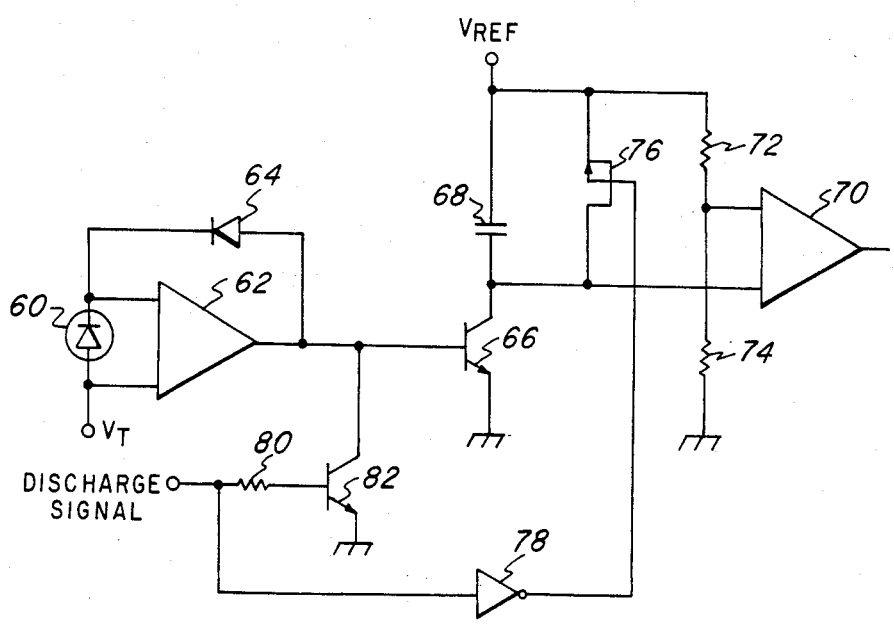
FIG. 4 illustrates a schematic diagram of a shutter control circuit for a camera of the second embodiment of the present invention.

Reference is now made to FIG. 4 which shows the second embodiment of the present invention. In FIG. 4, 60 is a SPC which is a light receiving element, 62 a MOS amplifier and 64 a diode. The anode of SPC is connected to the reference voltage $V_T$. At the output of the MOS amplifier 62, a voltage into which a voltage corresponding to the light intensity is compressed is put out. 66 is an NPN transistor which expands the output voltage of the MOS amplifier 62. 68 is a capacitor one terminal of which is connected to the reference voltage $V_{REF}$ and the other terminal of which is connected to the collector of the transistor 66. 70 is a comparator, one input of which is connected to the junction of the capacitor 68 and the transistor 66. 72 and 74 are resistors which divide reference voltage $V_{REF}$. The junction of the resistors 72 and 74 is connected to the other input of the comparator 70. 76 is a Pch MOS FET, which is connected in parallel to the capacitor 68. 78 is an inverter. When the Discharge Signal is at high level, the output from the inverter 78 becomes low level and FET 76 made conductive. 80 is a resistor. 82 is an NPN transistor. When the Discharge Signal is at high level, the transistor 82 becomes conductive and the transistor 66 becomes non-conductive. In the above construction, since the Discharge Signal is at high level before the initiation of the exposure control operation, the transistor 82 becomes conductive and the transistor 66 becomes non-conductive. Since FET 76 is conductive at this time, the capacitor 68 is completely discharged. As the initiation of exposure control makes the Discharge Signal low level, the transistor 82 is made non-conductive, and a voltage into which the voltage corresponding to the intensity of the received light is compressed is put out at the output of MOS amplifier 62. Since FET 76 is conductive, too, the current expanded by the transistor 66 charges the capacitor 68. When the voltage at the junction of the capacitor 68 and the transistor 66 becomes lower than the voltage of the reference voltage $V_{REF}$ divided by the resistors 72 and 74, the comparator is inverted and exposure control is terminated.

While in the above second embodiment the transistor 82 is connected to the output of the MOS amplifier 62 to make the expanded current of the transistor 66 substantially zero when the transistor 82 is conductive, the same effect can be obtained by connecting the transistor 82 to the reference voltage $V_T$.

As described above, the present invention wherein a first switching element is connected in parallel to a capacitor for diciding the exposure time by the amount of charge and a second switching element is provided for minimizing the charging current substantially to zero and said first and second switching elements are made conductive before the initiation of exposure control thereby completely discharging the capacitor, produces an effect that a precise shutter speed can be obtained with small and inexpensive switching elements.

What is claimed is:

1. An automatic shutter timing control for a camera comprising:
    a capacitor which is charged by a current corresponding to the intensity of the received light;
    a MOS FET transistor connected in parallel to said capacitor; and
    means for reducing the current for charging said capacitor to a degree which is substantially negligible when said MOS FET transistor is conductive, said means having a switching element for making the charging current negligible.

2. The automatic shutter timing control of claim 1 further including:
    an automatic exposure control;
    timing control means for making said MOS FET transistor and said switching element non-conductive at the same time when said automatic exposure control is initiated; and
    a release button having a first and second stroke, wherein said timing control means makes said MOS FET transistor and said switching element non-conductive by the first stroke of said release button, and said timing control circuit makes said MOS FET transistor and said switching element conductive by the second stroke of said release button.

3. The automatic shutter timing control of claim 1 further including current mirror means for controlling the amount of capacitor current, said current mirror means including a pair of transistors with the bases thereof connected together, and said switching element is connected to said bases.

* * * * *